United States Patent Office 2,819,896
Patented Jan. 14, 1958

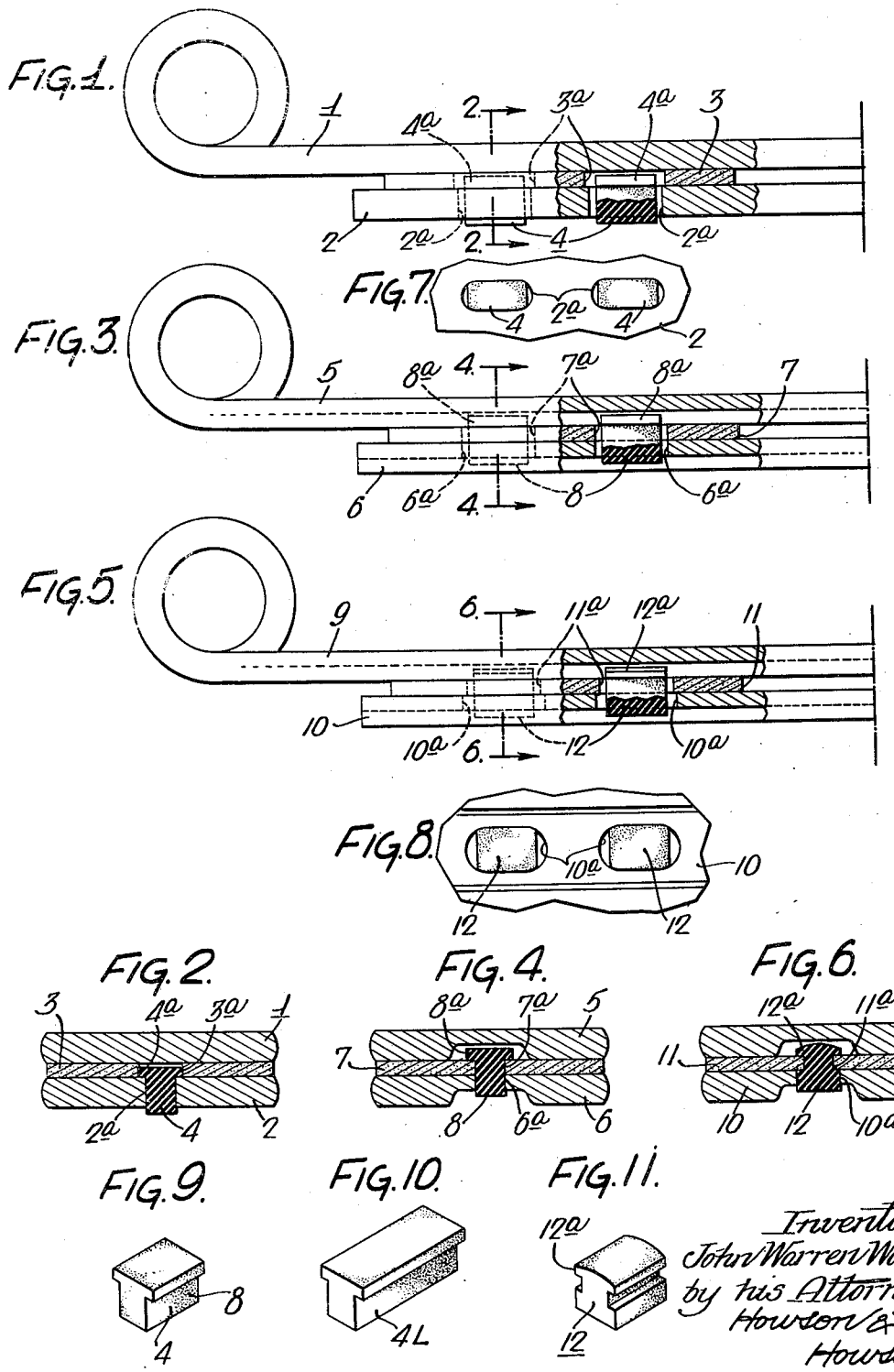

2,819,896

LEAF SPRING SPACING STRUCTURES AND ANCHORAGES THEREFOR

John Warren Watson, Wayne, Pa.

Application April 14, 1950, Serial No. 155,913

2 Claims. (Cl. 267—49)

This invention relates to means for holding a friction bearing structure in predetermined position between two frictionally opposed and relatively reciprocating bodies and in particular to means for holding a leaf-end friction bearing structure in a predetermined position between and adjacent the ends of two opposed leaves of a leaf spring.

A particular object of my invention is to provide positive means for maintaining a bearing structure, while in service, in a predetermined set position with relation to an end of one of two adjacent leaves of a leaf spring and very particularly in a manner to limit longitudinal, lateral and turning movements of the bearing structure with relation to that one leaf.

A further particular object of my invention is to provide anchoring means of a material such as soft rubber and which by reason of its deformable nature will provide for a floating action of the bearing structure with relation to the leaf to which it is anchored as set forth in my copending application of April 25, 1947, Serial No. 743,997, now Patent No. 2,621,922.

A further particular object of my invention in connection with the use of soft rubber as an anchor member, and as is provided for in my above-mentioned co-pending application, is generally to provide a hole, in the leaf or in the bearing structure or in both the leaf and the bearing structure, which is of greater volumetric size than the volume of that portion of the rubber member which lies within that hole or holes and thus provide space, directly at hand, for ready accommodation of any deformation of the rubber resulting from relative shear forces and movements between the bearing structure and the leaf and thus avoid the possibility of shear-cutting actions becoming effective.

A further object of my invention is to provide anchoring means as above which is relatively inexpensive and which is well adapted to mass production by a molding or extrusion process.

A further particular object of my invention is to provide anchoring means such as will permit, upon the spreading of the leaves, a free and ready removal of the bearing structure and its replacement in kind.

A further particular object of my invention is to provide a leaf-end friction bearing structure presenting to at least one of said leaves a surface of sufficient yieldability to readily conform, under the pressures imposed in service, to irregularities thereof and thus form an automatic seal against the entry of grit and abrasive-laden waters.

A further particular object of my invention is to provide a leaf-end friction bearing structure exhibiting frictional properties where of the static and dynamic coefficients of friction are sufficiently in balance to avoid setting up destructive spasmodic actions and/or objectionable noise-producing vibrations.

Other objects and advantages of the invention will be made apparent from the following description in connection with the accompanying drawings, in which:

Figure 1 is a fragmentary side elevational view, partly in section, showing two adjacent leaves of a leaf spring and which leaves are of S. A. E. flat section, and a leaf-end friction bearing structure spacing said leaves and two relatively spaced soft rubber anchor members each engaging a hole provided in the bearing structure and a hole provided in one of said leaves adjacent an end thereof and acting to limit longitudinal, lateral and turning movements of said bearing structure with relation to said one leaf.

Figure 2 is a cross sectional view on line 2—2, Fig. 1.

Figure 3 is a fragmentary side elevational view, partly in section, showing two adjacent leaves of a leaf spring and which leaves are of center-groove section, and a leaf-end friction bearing structure spacing said leaves and two relatively spaced soft rubber anchor members each engaging a hole provided in the bearing structure and a hole provided in one of said leaves adjacent an end thereof and acting to limit longitudinal, lateral and turning movements of said bearing structure with relation to said one leaf.

Figure 4 is a cross sectional view on line 4—4, Fig. 3.

Figure 5 is a fragmentary side elevational view, partly in section, showing two adjacent leaves of a leaf spring and which leaves are of center-groove section, and a leaf-end friction bearing structure spacing said leaves and two relatively spaced soft rubber members attached to said bearing structure and each engaging a hole provided in the bearing structure and a hole provided in one of said leaves adjacent an end thereof and acting to limit longitudinal, lateral and turning movements of said bearing structure with relation to said one leaf.

Figure 6 is a cross sectional view on line 6—6, Fig. 5.

Figure 7 is a fragmentary plan view of the underneath side of leaf 2, Fig. 1, showing a preferred form of leaf hole and the position of the rubber member therewithin. This underneath view applies also to leaf holes 6a and rubber members 8, Fig. 3.

Figure 8 is a fragmentary plan view of the underneath side of leaf 10, Fig. 5, showing a preferred form of leaf hole and the position of the rubber member therewithin.

Figure 9 is an isometric view of soft rubber members 4 and 8 shown respectively in Figs. 1–2 and 3–4.

Figure 10 is an isometric view showing the same T-section form of soft rubber anchor member 4, Fig. 9. This member is designated as 4L, the L signifying simply a greater length of member 4. The use of this member 4L in place of two spaced members 4 may be used to advantage as will be later discussed.

Figure 11 is an isometric view of soft rubber member 12 shown in Fig. 6.

Referring to Figs. 1 and 2, numeral 1 designates one of two adjacent leaves of a leaf spring of S. A. E. flat section; 2 designates the other of said leaves, 2a designates an elongated round-ended hole in leaf 2 adjacent an end thereof; 3 designates a leaf-end friction bearing structure spacing the adjacent spring leaves; 3a designates an elongated round-ended hole in the bearing structure; 4 designates a soft rubber anchor member in deep penetrative engagement with holes 2a and 3a; 4a designates flange means for maintaining anchor member 4 against vertical movements with relation to holes 2a and 3a. The stem portion of the anchor member is, in the present instance, of horizontal cross-sectional shape, i. e. rectangular, the development of which involves the use of not less than two linear dimensions.

Referring to Figs. 3 and 4, numeral 5 designates one of two adjacent leaves of a leaf spring of center-groove section; 6 designates the other of said leaves; 6a designates an elongated round-ended hole in leaf 6; 7 designates a leaf-end friction bearing structure spacing the adjacent leaves; 7a designates an elongated round-ended hole in the bearing structure; 8 designates a soft rubber anchor member in deep penetrative engagement with holes 6a and 7a; 8a designates flange means for maintaining anchor member 8 against vertical movements with relation to holes 6a and 7a.

Referring to Figs. 5 and 6, numeral 9 designates one of two adjacent leaves of a leaf spring of center-groove section; 10 designates the other of said leaves; 10a designates an elongated round-ended hole in leaf 10; 11 designates a leaf-end friction bearing structure spacing the adjacent spring leaves; 11a designates an elongated round-ended hole in the bearing structure; 12 designates a soft rubber anchor member in deep penetrative engagement with holes 10a and 11a; 12a designates flange means for maintaining anchor member 12 against vertical movements with relation to hole 10a and against downward movements with relation to hole 11a.

The bearing structures indicated by numerals 3, 7 and 11 in Figs. 1, 3 and 5 respectively may be made of any suitable construction such, for example, as textile fabric impregnated with and hence also coated with suitable friction material, such for example as disclosed in U. S. Patent No. 1,845,090, or of saturating paper similarly impregnated and coated, or of other suitable construction presenting a yieldable and conformable surface to one or both of the spring leaves and exhibiting frictional properties whereof the static and dynamic coefficients of friction are sufficiently in balance to avoid setting up destructive spasmodic actions and/or objectionable noise-producing vibrations.

A marked advantage in the use of soft rubber as an anchoring means for holding a leaf-end friction bearing structure in position between two adjacent leaves of a leaf spring is the gentle action of this resilient material against the bearing structure and this gentle action is particularly important if the bearing structure is of more or less fragile nature. A rubber anchor member, however, and its relationship with the holes with which it cooperates, must be judiciously designed if the inherent cushioning ability of soft rubber is to be made available. It is well known that soft rubber is about the most if not the most non-compressible substance known. It seems that all one can do with soft rubber is to deform it and that if it is desired that the rubber member be deformed at one point one must provide for a flow exit if that deformation is to be permitted to take place. Hence, if the rubber member is too closely confined, any pressure against it will be too solidly opposed and repeated applications of the deforming forces will not be readily absorbed and cushioned and will ultimately cause a breakdown of the soft rubber structure or the bearing structure or both of them. Speaking specifically of the use of soft rubber as anchoring means for holding a bearing structure in position between two leaves of a leaf spring, it must be remembered that the forces acting against the rubber are shearwise and occur as incessant hammer blows and this means, if the rubber is to survive, these rapid-fire deformations must be given a closely unopposed flow exit and that this flow exit must be adequate if the cushioning action is to be adequate. If considerably elongated and if the total top or bottom area of the rubber anchor member is given an unrestricted flow exit as here shown, the member may be made to fit the holes, that is, occupy the full volumetric size of the holes. These unconfined and large top and bottom surface areas or even the bottom area alone will adequately accommodate the flow of the rubber and hence will permit adequate deformation and cushion, against the longitudinal shear forces encountered in service, to prevent a breakdown of the rubber. I prefer, however, that the anchor member shall not be made to fit both of the holes and instead that either one or both of the holes shall be made to have a horizontal cross sectional area greater than the mean horizontal cross sectional area of that portion of the anchor member which is positioned within such a hole or holes. In each of the illustrations, Figs. 1, 3 and 5, I show an elongated rubber member cooperating with an elongated round-ended hole in the bearing structure as well as in the spring leaf. Even with the ease of deformation provided by the extent of elongation of the anchor members as here shown, I prefer the additional ease provided by making both of the holes round-ended because of the increased float action which is thus permitted between the bearing structure and the leaf to which it is anchored in order to provide for a more uniform distribution of the work between both surfaces of the bearing structure and which action is included as one of my objects. I also prefer the round-ended hole in both of the members for greater ease of assembling the rubber member into the holes. In connection with these elongated round-ended holes I prefer that the rubber anchor member be made to provide a slightly snug degree of fit between it and the sides of the holes. This slightly snug lateral fit provides the best possible resistance to counteract forces tending to cause turning movements of the bearing structure with relation to the leaf to which it is anchored. These snug lateral fits also provide a grip between the anchor member and the holes which is adequate to hold the parts firmly together and against loss from between the leaves during the roughest handling of the spring in transit from the spring maker to the car maker and also during the roughest treatment which could be given the spring in service.

The lapel-button type of soft rubber anchor member 12 shown in Figs. 5, 6 and 11 is readily installed in hole 11a in the bearing structure 11 by applying a sharp pressure from a narrow elongated punch against the base of the anchor member. The advantage of this form of anchor over the basic T-section form would be to satisfy a spring maker who might prefer to have his spring assemblers handle the bearing structure and anchor members together as a unit rather than as three separate parts. This might prove to be an item of importance to facilitate work and save time on the spring assembly bench.

For use in connection with smaller and lighter weight motor cars, which are presently gaining in favor, bearing structures of shorter length might readily be used and still keep the pressure per square inch against them within reasonable and satisfactory limits. With such shorter length it might be found preferable to use one anchor member of say one inch length rather than two spaced anchor members each of say one-half inch length. This shortening of the anchorage span would be most important were the bearing structures used in connection with leaves of S. A. E. flat section in order to keep the important end areas of the bearing structure intact and free of holes.

It will be noted that any of the anchor members here shown are of a shape permitting low cost production either by extrusion and cutting to length or by readily made molding equipment.

It will be noted also that the bearing structures as here anchored, upon the spreading of the leaves, are readily and instantly removable and replaceable in kind.

The term "elongated," as here employed, refers to a horizontal and not a vertical direction. The term "appreciably greater," as here employed, refers to a space greater than that which would be necessary in line with accepted practice in the matter of tolerance allowances suitable for a free fitting of two parts.

I claim:
1. In combination, two adjacent leaves of a leaf spring, a leaf-end friction bearing structure between said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising an anchor member of soft rubber or rubber-like material in deep penetrative engagement with a through hole provided in said bearing structure and in deep penetrative engagement with a hole provided in one of said leaves adjacent an end thereof and being supported against downward movements with relation to said holes by flange means integral with said anchor member, the mean horizontal cross sectional area of one of said holes being appreciably greater than the mean horizontal cross sectional area of that portion of said anchor member which is positioned within that hole.

2. In combination, two adjacent leaves of a leaf spring, a leaf-end friction bearing structure between said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising an anchor member of soft rubber or rubber-like material in deep penetrative engagement with a through hole provided in said bearing structure and in deep penetrative engagement with a hole provided in one of said leaves adjacent an end thereof and being supported against downward movements with relation to said holes by flange means integral with said anchor member and being limited against upward movements with relation to said hole in said leaf by the proximity of the leaf surface immediately above said anchor member, the mean horizontal cross sectional area of one of said holes being appreciably greater than the mean horizontal cross sectional area of that portion of said anchor member which is positioned within that hole.

References Cited in the file of this patent

UNITED STATES PATENTS

| | | |
|---|---|---|
| 1,447,191 | Vetter | Mar. 6, 1923 |
| 2,028,299 | Swinton | Jan. 21, 1936 |
| 2,172,132 | Schneible | Sept. 5, 1939 |
| 2,270,516 | Dow | Jan. 20, 1942 |
| 2,280,201 | Thompson | Apr. 21, 1942 |
| 2,319,172 | Watson et al. | May 11, 1943 |